United States Patent [19]

Tattari

[11] Patent Number: 5,265,158

[45] Date of Patent: Nov. 23, 1993

[54] CONSTRUCTION OF A STAND ALONE PORTABLE TELEPHONE UNIT

[75] Inventor: Jouko Tattari, Salo, Finland

[73] Assignee: Nokia Mobile Phones Ltd., Salo, Finland

[21] Appl. No.: 881,475

[22] Filed: May 11, 1992

Related U.S. Application Data

[63] Continuation-in-part of Ser. No. 499,991, Mar. 26, 1990.

[30] Foreign Application Priority Data

May 25, 1989 [FI] Finland .................................. 892561

[51] Int. Cl.$^5$ .......................... H04M 1/00; H04B 1/38
[52] U.S. Cl. ....................................... 379/433; 455/90
[58] Field of Search .................... 379/56, 58, 61, 428, 379/433, 437; 455/89, 90, 347

[56] References Cited

U.S. PATENT DOCUMENTS

| | | | |
|---|---|---|---|
| 5,136,229 | 8/1992 | Galvin | 320/2 |
| 5,142,573 | 8/1992 | Umezawa | 379/454 |
| 5,170,494 | 12/1992 | Levanto | 455/90 |

*Primary Examiner*—Jin F. Ng
*Assistant Examiner*—William D. Cumming
*Attorney, Agent, or Firm*—Darby & Darby

[57] ABSTRACT

A stand-alone portable radio telephone unit, includes an upper part, and a lower part. The upper and lower parts have similar peripheral shapes and in combination include all of the components necessary to form a handset for connection with a main unit in a mobile phone system. An intermediate part is located between the upper and lower parts and includes radio frequency components, an antenna and battery means. The upper, lower and intermediate parts in combination include all of the components necessary to form a stand-alone portable radio telephone unit. Bringing the three parts into abutting engagement completes the required electrical connections between the parts.

7 Claims, 3 Drawing Sheets

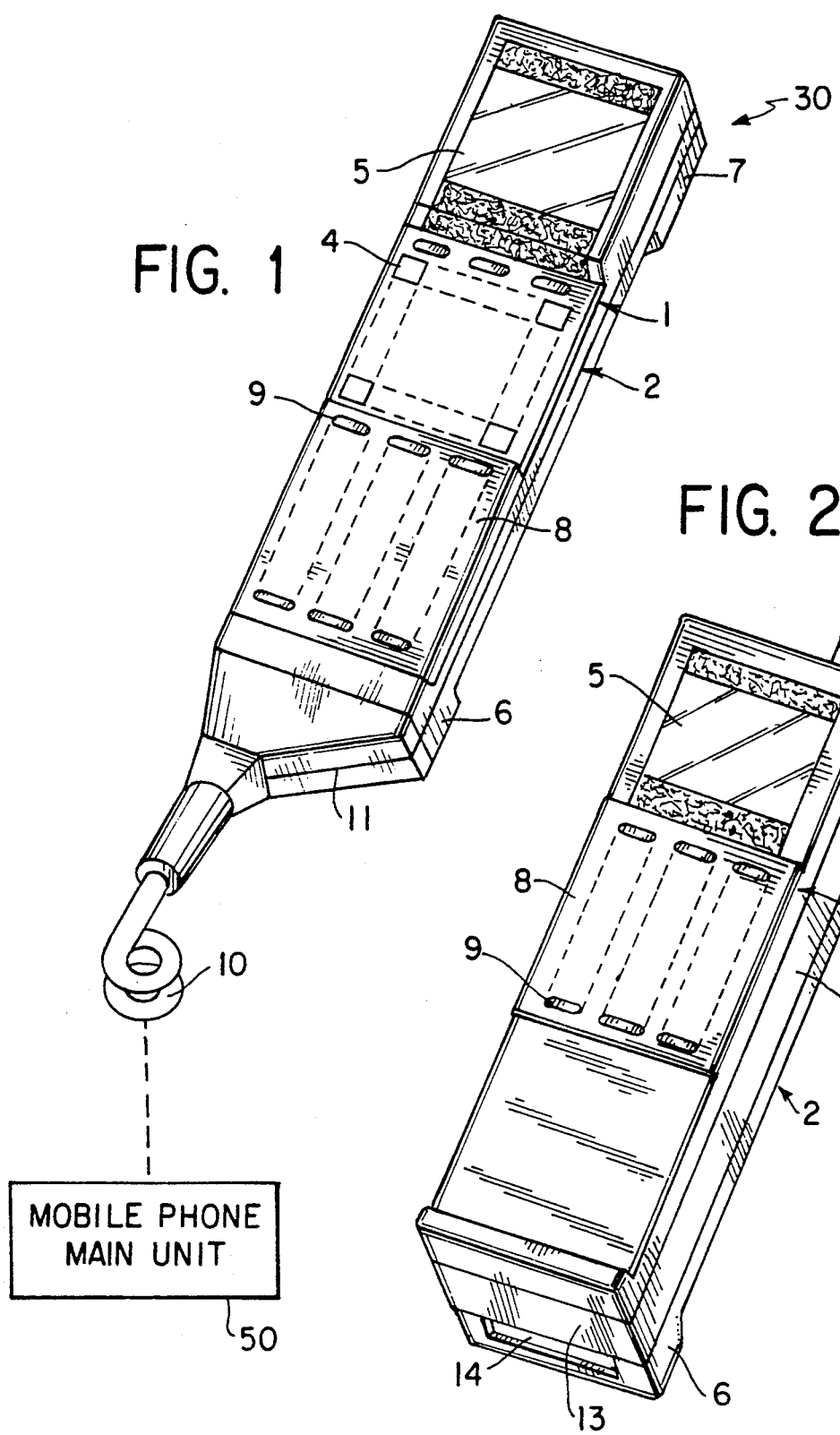

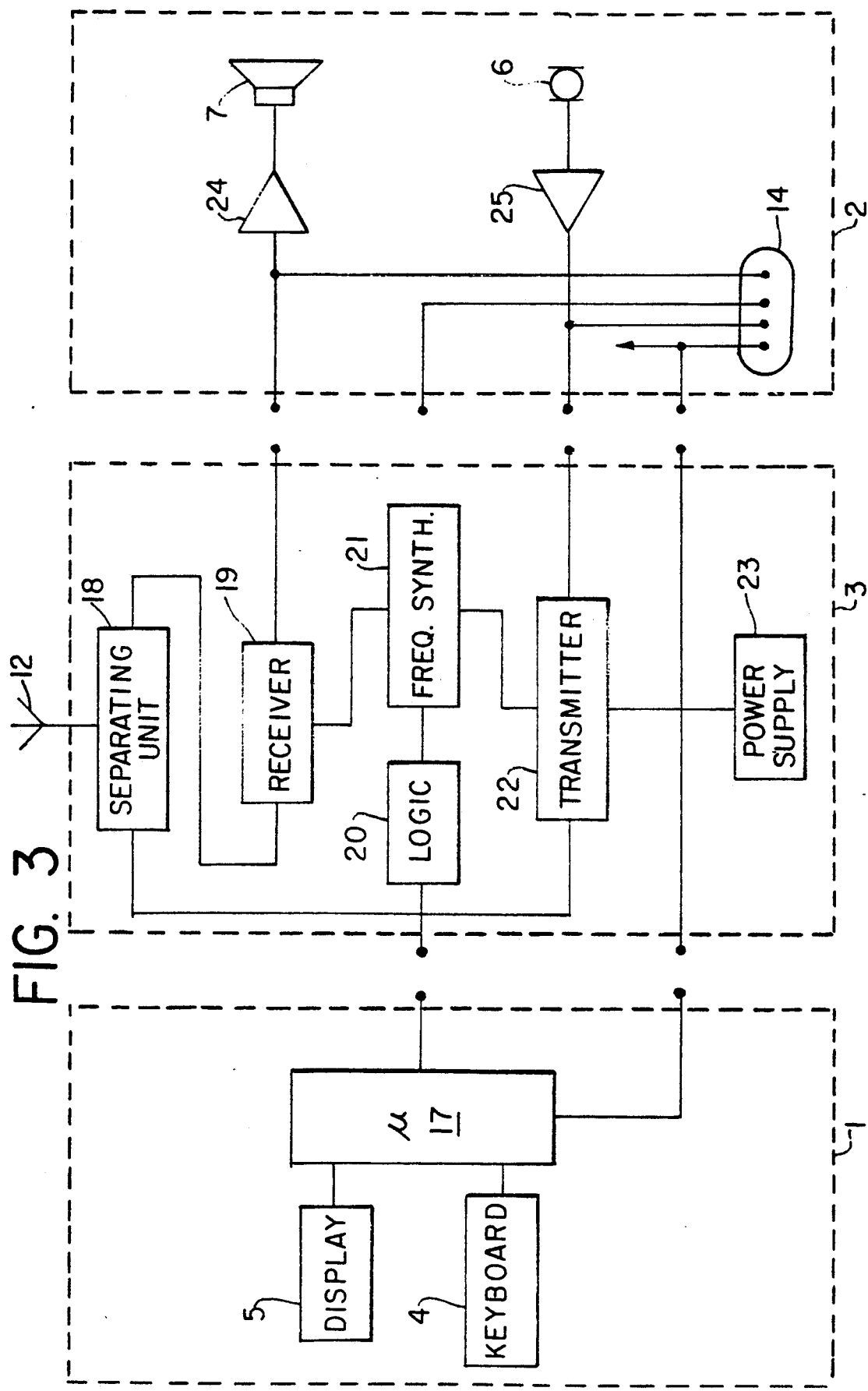

CONSTRUCTION OF A STAND ALONE PORTABLE TELEPHONE UNIT

This is a continuation-in-part, of application Ser. No. 499,991, filed Mar. 26. 1990.

BACKGROUND OF THE INVENTION

The present invention relates to the construction of a stand-alone portable radio-telephone unit, more specifically the construction of a stand-alone portable radio telephone unit operating as an independent self-contained device.

Stand-alone portable radio telephone units of this type are battery-powered, small-sized portable telephone devices which work like mobile (car) phones and use a mobile phone system but are not wired to any other module which may be, for example, installed in a vehicle. Such a stand-alone portable radio telephone unit thus comprises all parts including the antenna required for a mobile station.

SUMMARY OF THE INVENTION

The stand-alone portable radio telephone unit is a self-contained device and includes the same parts as, for example, the hand-held operating unit (handset) of a mobile phone, though the mobile phone operating unit does not include rf-parts, antenna and batteries of the subject stand-alone portable radio telephone unit. Therefore, regarding manufacture and assembly, it would be most advantageous to utilize existing parts of a mobile phone handset in constructing a stand-alone portable radio telephone. In addition, to have the appearance of the stand-alone portable radio telephone unit correspond with the appearance of a handset for connection to a mobile station, as far as possible, would be advantageous. Thereby these two instruments can be readily identified as instruments from the same manufacturer.

The features of the invention will be apparent from the enclosed claims.

DESCRIPTION OF THE DRAWINGS

The invention will be described further by way of an example with reference to the accompanying drawings, in which:

FIG. 1 is a perspective view of the handset of a mobile phone;

FIG. 2 shows a stand-alone portable radio telephone unit in accordance with the invention constructed utilizing the parts of the handset of FIG. 1;

FIG. 3 is a functional block diagram showing the electrical interconnections for the stand-alone portable radio telephone unit according to FIG. 2.

DESCRIPTION OF THE PREFERRED EMBODIMENT

Figure 4:
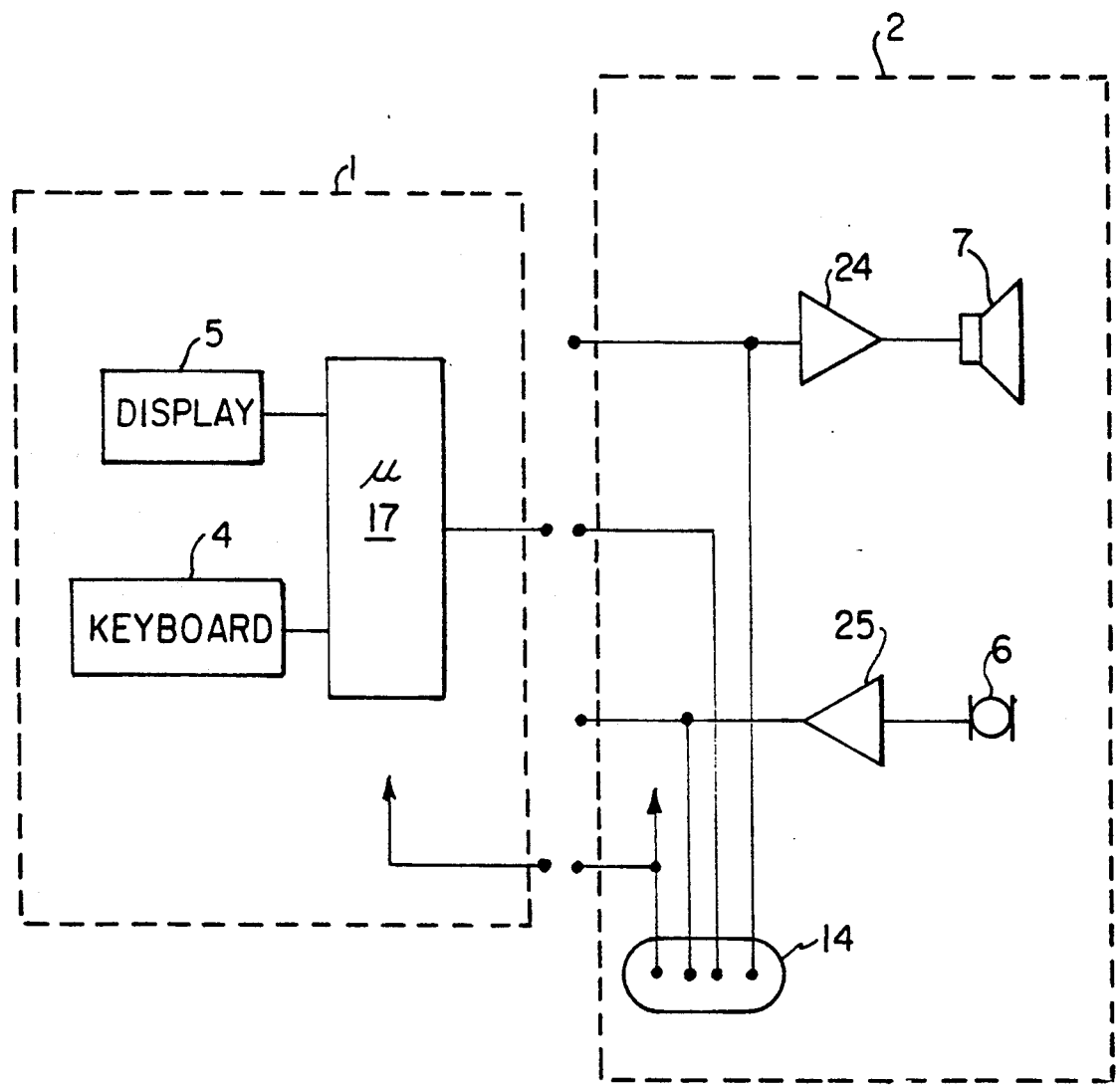
FIG. 4 is a drawing similar to FIG. 3 showing the electrical interconnections for the handset of a mobile phone for connection to a mobile station of FIG. 1.

The handset 30 for connection to a mobile station according to FIG. 1 comprises generally an upper half 1 and a lower half 2, each half being rectangular and joined together along the center line. The upper part 1 includes a key set 4 and a display 5. The lower part 2 includes a microphone 6 and an earphone 7.

The upper part 1 can be joined mechanically to the lower part 2 in any suitable fashion, for example, bolts (not shown) passing through the lower part 2 near the four corners can engage threaded receptacles in the upper part 1 so that the two parts are tightly locked together by inserting the bolts and turning them. Where the parts 1,2, are made of plastic, protrusions on one part can be engaged in sockets on the other parts so that they snap together, but may be pried apart by a twisting action, as for example, with a coin, inserted in specially provided depressions along the parting line between the parts 1,2. One skilled in the art of providing housings for portable radios, radio telephones, and the like, would have no difficulty in producing suitable connection means for the parts 1,2 in accordance with FIG. 1, and in accordance with FIG. 2 as discussed more fully hereinafter.

If required, the handset 30 for connection to a mobile station can be equipped with a sliding lid 8, which is provided with a prepared surface 9 and can be pushed over the key set 4 to cover it.

The handset 30 for connection to a mobile station is connected to a main unit 50 of a mobile phone with a spiral cord 10. A cable clamp part at 11 is closely attached to the microphone end of the handset 30.

In FIG. 2 there is shown a stand-alone portable radio telephone unit 40 in accordance with the invention. This stand-alone portable radio telephone 40 utilizes the above mentioned parts 1 and 2 of the handset 30. Between these parts 1,2 is positioned in a sandwich fashion an intermediate body 3 which contains the rf-parts of the stand-alone portable radio telephone unit, an antenna 12 and a case for batteries. A connector 14 on part 2 allows the stand-alone portable radio telephone unit to be connected to e.g. the main unit of a mobile phone or to other auxiliaries. In using the part 1 in a handset 30 for connection to a mobile station, a cable clamp 11 covers this connector 14, which is used in conjunction with the spiral cord 10.

The mechanical joining of the parts 1,2,3 can be accomplished in many ways. Where, for example, the parts 1,2 were held together by corner bolts in construction of the handset 30, aligned through holes can be provided at the corners of the part 3, and longer bolts can be used to join together the three parts 1,2,3. One skilled in the art of constructing housings for electronic devices, as discussed above, would have no difficulty in providing housings for parts 1,2 and 3, where the parts 1,2 are used to construct either a handset 30 for connection to a mobile station or a stand-alone portable radio telephone unit 40.

FIGS. 3 and 4 show respectively electrical interconnections for the stand-alone portable radio telephone unit 40 of FIG. 2, and for the handset 30 for connection to a mobile station of FIG. 1.

The upper part 1 (in both figures) includes the keyboard 4, display 5 and microprocessor (or a display/keyboard driver) 17 serving to transmit keyboard instructions and to display the instructions on the display 5.

The lower part 2 (in both figures) contains the loudspeaker 7, amplifier 24, microphone 6, and the connector 14.

The intermediate part 3 contains a receiver 19, and transmitter 22 with a separating unit 18 that separates transmitted signals going to the antenna 12 from received signals from the antenna 12. The unit 18 prevents output of the transmitter 22 from entering the receiver 19.

Further, intermediate part 3 contains a frequency syntheses unit 21, power supply 23 and logic unit 20 for operation of the entire stand-alone portable radio telephone unit 40. In using the handset 30 for connection to a mobile station as in FIG. 4, that is, formed only of part 1 and part 2, all of the functions 18-23 in the intermediate part 3 of FIG. 3 are provided separately in a main unit installed, for instance, permanently in an automobile. Connections for the loudspeaker 7 and microphone 6 are made via connector 14 to the remote main unit.

The parts in FIGS. 3 and 4 are drawn with identity for the upper part 1 and lower part 2. The broken-vertical-lines in FIGS. 3 and 4 represent physical interfaces between the parts. It can be seen that the electrical contacts which come together in FIG. 4 when the upper part 1 is joined to the lower part 2 also make appropriate connection to suitably aligned contacts in intermediate part 3, so that when the three parts 1,2,3 are physically joined together, the stand-alone portable radio telephone unit 40 is electrically and physically connected and complete.

As a result of the construction of the stand-alone portable radio telephone unit 40 in accordance with the invention, it is possible to use many parts common to the handset 30 for connection to a mobile station, thereby saving in the costs of molds and other manufacturing costs. The intermediate module part 3 is provided with such contact means that it automatically connects electrically to the upper part 1 and the lower part 2 when the handset is physically assembled.

When the same parts 1,2 are directly joined together mechanically, the handset for connection to a mobile station (FIG. 4) is complete electrically and physically.

The appearance of the operating unit and the handset may vary considerably from that shown in the drawing, without departing from the inventive concept.

What is claimed:

1. A stand-alone portable radio telephone unit, comprising:
    an upper part;
    a lower part, said upper and lower parts having similar peripheral shapes, said upper and lower parts in combination including components for forming a handset for connection with a main unit of a mobile phone;
    an intermediate part located between said upper and lower parts and separating said upper and lower parts from each other, said intermediate part substantially having said peripheral shape and being aligned with said upper and lower parts and abuttingly connected to said upper part at a first interface and to said lower part at a second interface, said intermediate part including radio frequency components, an antenna and battery means, said upper, lower and intermediate parts in combination including components for forming said stand-alone portable radio telephone unit;
    first electrical connection means fixed on said upper part and on said intermediate part, for completing electrical connections between said upper and intermediate parts at said first interface when said upper and intermediate parts are abuttingly joined to each other with said shapes in substantial alignment;
    second electrical connection means fixed on said lower part and on said intermediate part, for completing electrical connections between said lower and intermediate parts at said second interface when said lower and intermediate parts are abuttingly joined to each other with said shapes in substantial alignment;
    said first electrical connection means fixed on said upper part and said second electrical connection means fixed on said lower part being positioned for completing electrical connections between said upper part and said lower part to form said handset for connection to a main unit of a mobile phone when said upper part and lower part are abuttingly joined directly to each other at a third interface with said shapes in substantial alignment.

2. A stand-alone portable radio telephone unit as in claim 1, further comprising a connector on one of said upper part and said lower part for connection to said main unit of a mobile phone when said upper and lower parts are joined to comprise said handset.

3. A stand-alone portable radio telephone unit as in claim 1, wherein said intermediate part has opposite ends, the battery means comprising a battery housing located at one of said opposite ends and the antenna being attached at the other of the opposite ends.

4. A stand alone portable radio telephone unit as in claim 1, wherein said upper and lower parts and said intermediate part all have a substantially identical rectangular shape.

5. A stand-alone portable radio telephone unit as in claim 1, wherein said upper part includes a key set, said telephone unit further comprising a sliding lid that can be pushed over said key set.

6. A stand-alone portable radio telephone unit as in claim 1, wherein said upper part includes a key pad and display.

7. A stand-alone portable radio telephone unit as in claim 1, wherein said lower part includes a microphone and an earphone.

* * * * *